(12) United States Patent
Fujimura

(10) Patent No.: US 10,553,206 B2
(45) Date of Patent: Feb. 4, 2020

(54) VOICE KEYWORD DETECTION APPARATUS AND VOICE KEYWORD DETECTION METHOD

(71) Applicant: KABUSHIKI KAISHA TOSHIBA, Minato-ku (JP)

(72) Inventor: Hiroshi Fujimura, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 182 days.

(21) Appl. No.: 15/691,159

(22) Filed: Aug. 30, 2017

(65) Prior Publication Data
US 2018/0268809 A1 Sep. 20, 2018

(30) Foreign Application Priority Data
Mar. 17, 2017 (JP) .................................. 2017-053324

(51) Int. Cl.
*G10L 15/08* (2006.01)
*G10L 15/30* (2013.01)
*G10L 15/02* (2006.01)
*G10L 15/22* (2006.01)

(52) U.S. Cl.
CPC .............. *G10L 15/08* (2013.01); *G10L 15/02* (2013.01); *G10L 15/22* (2013.01); *G10L 15/30* (2013.01); *G10L 2015/025* (2013.01); *G10L 2015/027* (2013.01); *G10L 2015/088* (2013.01)

(58) Field of Classification Search
CPC ........ G06Q 30/02; G10L 15/02; G10L 15/063
USPC ..................... 704/256.5, 245, 257, 232, 255; 705/14.55; 707/999.004
See application file for complete search history.

(56) References Cited

U.S. PATENT DOCUMENTS

| 2008/0319746 | A1* | 12/2008 | Okamoto | G06F 16/345 704/245 |
| 2009/0055185 | A1* | 2/2009 | Nakade | G10L 15/30 704/257 |
| 2012/0130816 | A1* | 5/2012 | Sakamoto | G06Q 30/02 705/14.55 |
| 2014/0337031 | A1* | 11/2014 | Kim | G06F 3/167 704/256.5 |
| 2015/0095027 | A1* | 4/2015 | Parada San Martin | G10L 15/02 704/232 |
| 2015/0310858 | A1* | 10/2015 | Li | G10L 15/16 704/232 |
| 2016/0275405 | A1 | 9/2016 | Nasu | |

FOREIGN PATENT DOCUMENTS

JP 2016-177474 10/2016

* cited by examiner

*Primary Examiner* — Akwasi M Sarpong
(74) *Attorney, Agent, or Firm* — Oblon, McClelland, Maier & Neustadt, L.L.P.

(57) ABSTRACT

According to one embodiment, a voice keyword detection apparatus includes a memory and a circuit coupled with the memory. The circuit calculates a first score for a first sub-keyword and a second score for a second sub-keyword. The circuit detects the first and second sub-keywords based on the first and second scores. The circuit determines, when the first sub-keyword is detected from one or more first frames, to accept the first sub-keyword. The circuit determines, when the second sub-keyword is detected from one or more second frames, whether to accept the second sub-keyword based on a start time and/or an end time of the one or more first frames and a start time and/or an end time of the one or more second frames.

20 Claims, 11 Drawing Sheets

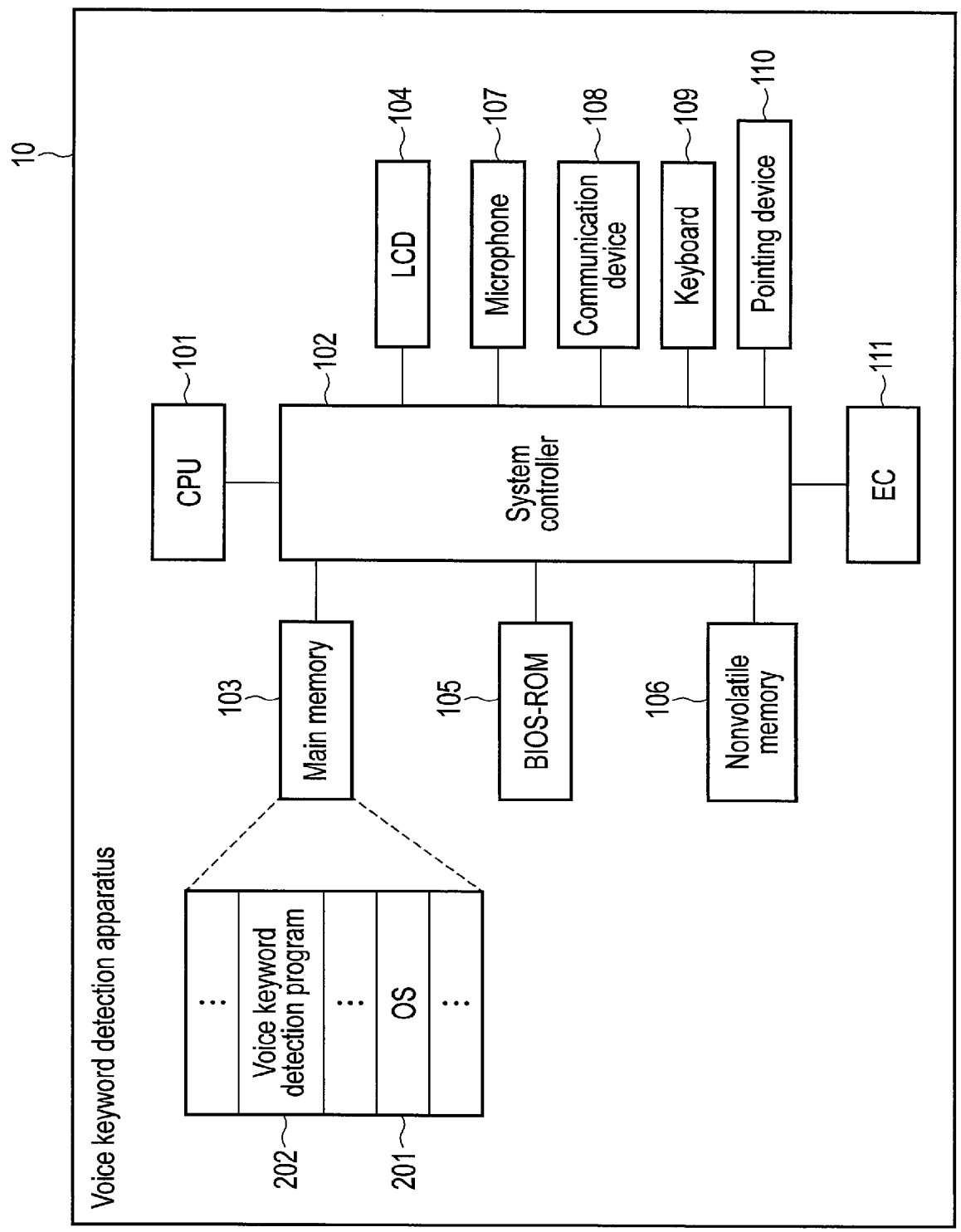
F I G. 2

| ID | Phoneme sequence | Threshold score | ... |
|---|---|---|---|
| w1 | ... | ... | ... |
| w2 | ... | ... | ... |
| w3 | ... | ... | ... |
| w4 | ... | ... | ... |
| ⋮ | ⋮ | ⋮ | ⋮ |

F I G. 7

| ID | Sub-keyword sequence | ... |
|---|---|---|
| W1 | w1,w2 | ... |
| W2 | w1,w3 | ... |
| ⋮ | ⋮ | ⋮ |

F I G. 8

| Sub-keyword sequence | Acceptance minimum | Acceptance maximum | ... | |
|---|---|---|---|---|
| w1,w2 | ... | ... | ... | |
| w1,w3 | ... | ... | ... | |
| ⋮ | ⋮ | ⋮ | ⋮ | ⋮ |

F I G. 9

| ID | Score | Start time | End time | ... |
|----|-------|------------|----------|-----|
| w1 | ... | ... | ... | ... |
| w2 | ... | ... | ... | ... |
| ⋮ | ⋮ | ⋮ | ⋮ | ⋮ |
F I G. 10
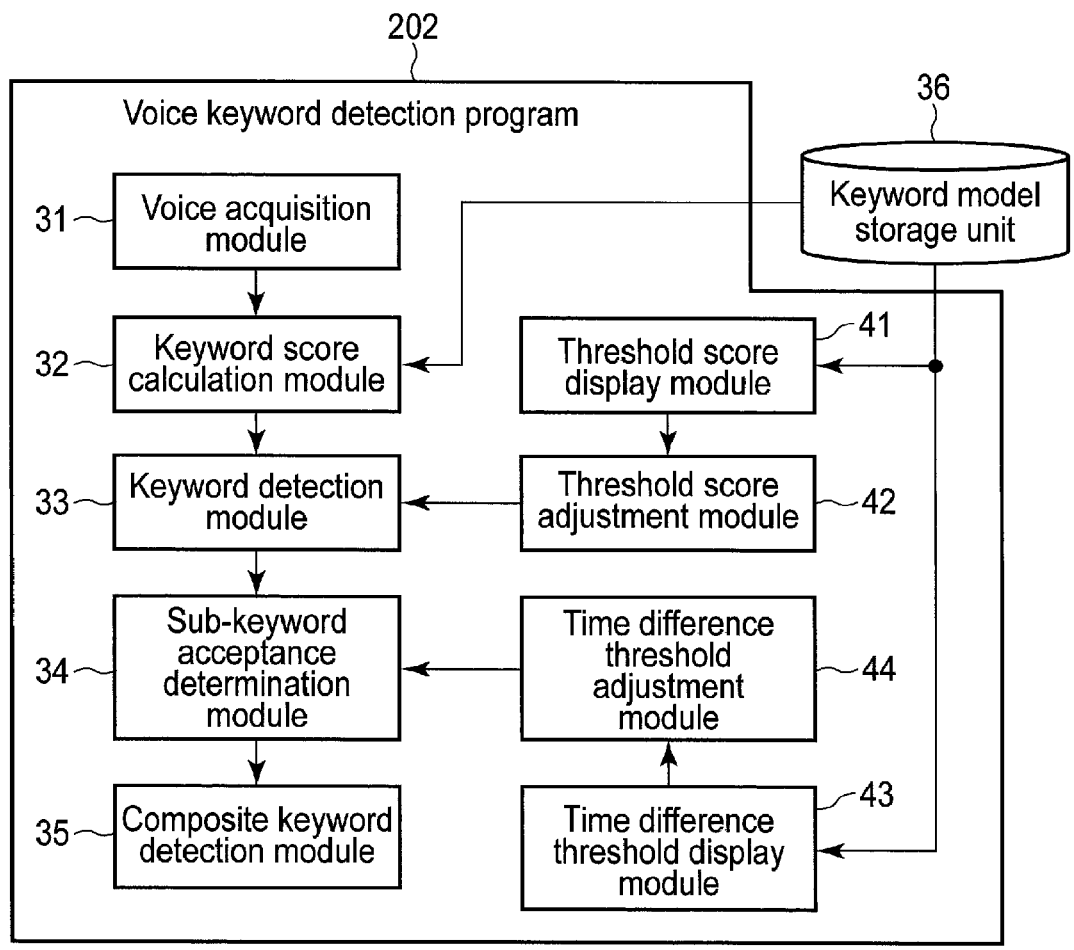
F I G. 11

VOICE KEYWORD DETECTION APPARATUS AND VOICE KEYWORD DETECTION METHOD

CROSS-REFERENCE TO RELATED APPLICATIONS

This application is based upon and claims the benefit of priority from Japanese Patent Application No. 2017-053324, filed Mar. 17, 2017, the entire contents of which are incorporated herein by reference.

FIELD

Embodiments described herein relate generally to a voice keyword detection apparatus which detects a keyword from a voice, and a voice keyword detection method applied to the apparatus.

BACKGROUND

In recent years, various electronic devices have been increasing which have a function to detect a voice of a keyword included in a voice and start a specific operation in accordance with the keyword. A user can activate an electronic device by speaking a keyword without a complicated operation.

BRIEF DESCRIPTION OF THE DRAWINGS

FIG. 2 is a block diagram illustrating a system configuration of the voice keyword detection apparatus of the first embodiment.

FIG. 7 is an illustration indicating a configuration example of keyword/sub-keyword data used by the voice keyword detection apparatus of the first embodiment.

FIG. 8 is an illustration indicating a configuration example of composite keyword data used by the voice keyword detection apparatus of the first embodiment.

FIG. 9 is an illustration indicating a configuration example of time difference threshold data used by the voice keyword detection apparatus of the first embodiment.

FIG. 10 is an illustration indicating a configuration example of score data used by the voice keyword detection apparatus of the first embodiment.

FIG. 11 is a block diagram illustrating a functional configuration of a voice keyword detection program executed by a voice keyword detection apparatus according to a second embodiment.

DETAILED DESCRIPTION

Various embodiments will be described hereinafter with reference to the accompanying drawings.

In general, according to one embodiment, a voice keyword detection apparatus includes a memory and a circuit coupled with the memory. The circuit acquires voice data including frames. The circuit calculates a first score for a first sub-keyword and a second score for a second sub-keyword by matching a phoneme sequence, a phonological representation, a pronunciation notation, a mora, or a notation associated with each of the first sub-keyword and the second sub-keyword with each frame of the voice data, wherein a first keyword includes the first sub-keyword and the second sub-keyword which follows the first sub-keyword. The circuit detects the first sub-keyword from the voice data based on the first score and detect the second sub-keyword from the voice data based on the second score. The circuit determines, when the first sub-keyword is detected from one or more first frames of the frames, to accept the first sub-keyword and determines, when the second sub-keyword is detected from one or more second frames of the frames, whether to accept the second sub-keyword based on a start time and/or an end time of the one or more first frames and a start time and/or an end time of the one or more second frames. The circuit outputs the first keyword when it is determined to accept the second sub-keyword.

First Embodiment

Figure 1:
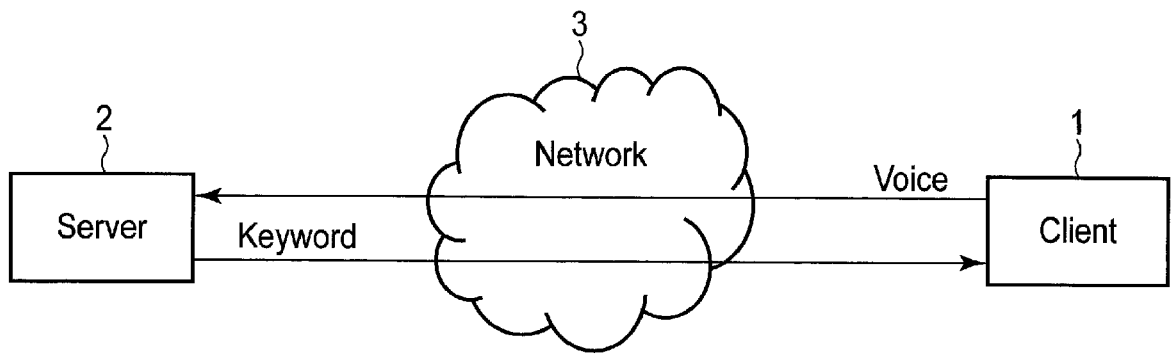
FIG. 1 is a block diagram illustrating an example of a configuration of a voice keyword detection system including a voice keyword detection apparatus according to a first embodiment.

FIG. 1 illustrates a configuration example of a voice keyword detection system including a voice keyword detection apparatus according to a first embodiment. This voice keyword detection system includes a client 1 and a server 2. The server 2 may be realized, for example, as a server computer. The client 1 may be realized as a portable information terminal, such as a tablet computer, a smart phone, a cell phone, and a PDA, a personal computer, or an integrated system incorporated into various electronic apparatuses. The client 1 and the server 2 can exchange data via a network 3. Further, at least one of the client 1 and the server 2 includes a voice keyword detection function for detecting a keyword from a voice.

The voice keyword detection system can detect a keyword from voice data (a voice signal) generated by using a microphone etc., included in the client 1. More specifically, the client 1 transmits, to the server 2 via the network 3, the voice data generated by using the microphone etc., included in the client 1. The server 2 detects a keyword from the voice data received from the client 1 by using the voice keyword detection function and transmits the keyword to the client 1 via the network 3. As a result, for example, the client 1 can start a specific operation corresponding to the detected keyword. The client 1 may transmit, to the server 2, a voice feature (for example, voice feature vectors), not the voice data, generated by using the voice data. The server 2 may detect a keyword from the received voice feature and can transmit the keyword to the client 1.

The client 1 may have the voice keyword detection function. In such a case, the client 1 can detect a keyword from the voice data generated by using the microphone etc., included in the client 1 by using the voice keyword detection function.

In this manner, in the embodiment, a keyword can be detected from voice data by using the voice keyword detection function provided in the client 1 and/or the server 2.

For clarification, the client 1 having the voice keyword detection function will be exemplified below as a voice keyword detection apparatus 10 in the embodiment.

FIG. 2 is a block diagram illustrating a system configuration of the voice keyword detection apparatus 10. The voice keyword detection apparatus 10 includes a CPU 101, a system controller 102, a main memory 103, a BIOS-ROM 105, a nonvolatile memory 106, a microphone 107, a communication device 108, a keyboard 109, a pointing device 110, and an embedded controller (EC) 111.

The CPU 101 is a processor which controls operations of various components in the voice keyword detection apparatus 10. The CPU 101 executes various programs loaded from the nonvolatile memory 106, which is a storage device, into the main memory 103. These programs include an operating system (OS) 201 and various application programs. The application programs include a voice keyword detection program 202. The voice keyword detection program 202 includes instructions for detecting a keyword from voice data.

Further, the CPU 101 executes a basic input/output system (BIOS) stored in the BIOS-ROM 105. The BIOS is a program for hardware control.

The system controller 102 is a device connecting a local bus of the CPU 101 and various components. A memory controller to access-control the main memory 103 is incorporated in the system controller 102. Further, a display controller to control the LCD 104 used as a display monitor of the voice keyword detection apparatus 10 is incorporated in the system controller 102. A display signal generated by this display controller is sent to the LCD 104. The LCD 104 displays a screen image based on the display signal.

Further, the system controller 102 incorporates an audio codec. The audio codec controls the microphone 107. The audio codec generates a voice signal (voice waveform) based on a voice collected by the microphone 107.

The communication device 108 is configured to perform wired communication or wireless communication. The communication device 108 includes a transmitter which transmits a signal and a receiver which receives a signal.

The keyboard 109 and the pointing device 110 are devices for input by a user. The pointing device 110 is a device to detect a point and a movement of the point on a screen of the LCD 104 such as a mouse, a touch pad and a touch panel.

The EC 111 is a one-chip microcomputer including an embedded controller for power management. The EC 111 includes a function to power on or off the voice keyword detection apparatus 10 in response to an operation of a power button by a user.

In recent years, an application has been increasing which detects a target keyword voice from a voice waveform and causes a device to operate in accordance with the keyword. A device, which operates in response to receiving a keyword, always receives a voice and detects whether the keyword is spoken from the voice. Therefore, the device is desirably operated with low power and with a low calculation load. Further, such that a user comfortably uses a device, the device needs to operate as soon as possible after receiving a keyword. Therefore, the device desirably detects a voice keyword at a low delay.

In a case where a device needs to accept multiple keywords, first and second methods may be applied to the device, for example. The first method includes comparing scores each indicating a possibility that a keyword candidate is spoken in a certain time range of a voice waveform and detecting the keyword candidate with the highest score. The second method includes performing binary determination to determine whether each keyword utterance exceeds a predetermined threshold score in a time range of a voice waveform. In comparison with the first method, the second method realizes an algorithm capable of detecting a keyword with a low calculation cost at a low delay. However, if the second method applied to the device, it is difficult to classify two keywords having many same pronunciation strings. In a case where keywords, such as "communication" and "communicator", are set, "tor" and "tion" are only different in pronunciation strings thereof. Therefore, when "communication" or "communicator" is spoken and a score of "communica" is high, both keywords are detected.

As described above, in the voice keyword detection method performing binary determination in which a voice keyword is detected or not detected, in a case where two or more keywords include same pronunciation strings, every keyword having the same pronunciation strings are detected.

Therefore, in this embodiment, after sub-keywords obtained by dividing a keyword are detected from a voice, it is determined whether a keyword (hereinafter also called a composite keyword) formed by sub-keywords is accepted based on a start time and/or an end time when the sub-keywords are detected. As a result, a keyword can be quickly and correctly detected from a voice.

Figure 3:
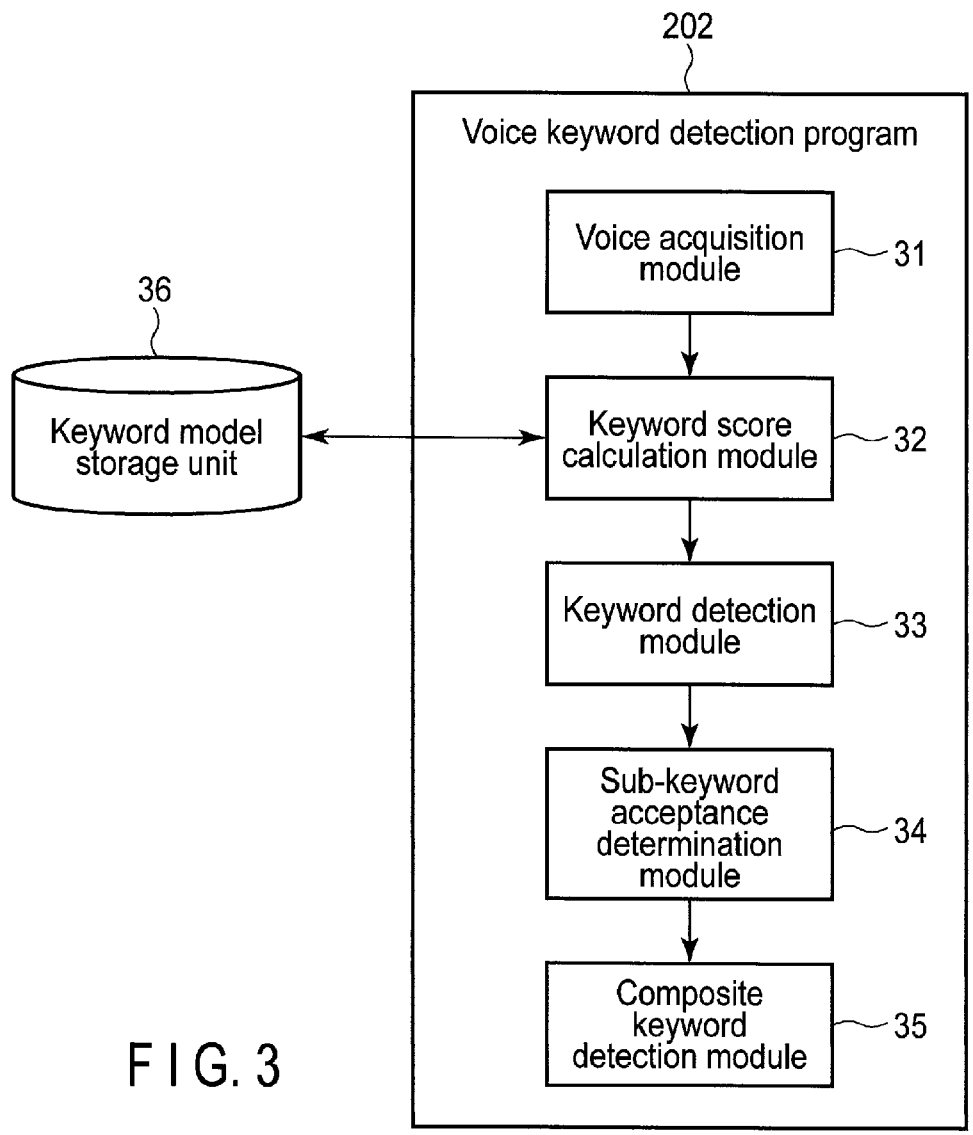
FIG. 3 is a block diagram illustrating a functional configuration of a voice keyword detection program executed by the voice keyword detection apparatus of the first embodiment.

FIG. 3 is a block diagram illustrating a functional configuration of the voice keyword detection program 202 executed by the voice keyword detection apparatus 10. The voice keyword detection program 202 includes a voice acquisition module 31, a keyword score calculation module 32, a keyword detection module 33, a sub-keyword acceptance determination module 34, and a composite keyword detection module 35. Each module of the voice keyword detection program 202 may read various data stored in a keyword model storage unit 36 and may write data in the keyword model storage unit 36. For example, a partial region of the nonvolatile memory 106 is allocated to the keyword model storage unit 36.

The keyword model storage unit 36 stores keyword models corresponding to keywords. Each keyword model is determined by a phoneme sequence, a phonological representation, a mora, a pronunciation notation, or a notation of a corresponding keyword. Further, at least one keyword model of the keyword models is a composite keyword model that is composed of two or more sub-keyword models corresponding to two or more sub-keywords each expressing a part of a corresponding keyword (composite keyword). The sub-keyword model is also determined based on a phoneme sequence, a phonological representation, a mora, a pronunciation notation, or a notation of a corresponding sub-keyword and is stored in the keyword model storage unit 36. Further, the composite keyword model includes information indicating a front and rear relation of an utterance order between sub-keywords included in a keyword.

The voice acquisition module 31 acquires voice data including frames. The voice acquisition module 31, for example, receives and digitizes a voice waveform and outputs a voice feature for each frame.

The keyword score calculation module 32 calculates a keyword score for the voice feature by using a keyword model and a sub-keyword model (hereinafter also referred to as a keyword/sub-keyword model) stored in the keyword model storage unit 36.

The keyword detection module 33 detects a keyword and a sub-keyword in accordance with determination based on the keyword score and a predetermined threshold score.

When a sub-keyword is detected by the keyword detection module 33, the sub-keyword acceptance determination module 34 determines whether to accept the sub-keyword based on start information and/or end information of the sub-keyword.

The composite keyword detection module 35 outputs a composite keyword as a detection result in a case where a sub-keyword accepted by the sub-keyword acceptance determination module 34 is a final sub-keyword included in the composite keyword.

Here, the case will be exemplified where the keyword model storage unit 36 stores:

(1) a keyword model (composite keyword model) of a first keyword including a first sub-keyword and a second sub-keyword following the first sub-keyword;
(2) a keyword model (composite keyword model) of a second keyword including the first sub-keyword and a third sub-keyword following the first sub-keyword; and
(3) a keyword model of a third keyword.

When the voice acquisition module 31 acquires voice data including frames, the keyword score calculation module 32 calculates, for example, a first score for the first sub-keyword by matching a phoneme sequence, a phonological representation, a pronunciation notation, a mora, or a notation associated with the first sub-keyword with each frame of the voice data, and calculates a second score for the second sub-keyword by matching a phoneme sequence, a phonological representation, a pronunciation notation, a mora, or a notation associated with the second sub-keyword with each frame of the voice data.

Next, the keyword detection module 33 detects the first sub-keyword from the voice data based on the first score and detects the second sub-keyword from the voice data based on the second score. More specifically, the keyword detection module 33 detects the first sub-keyword when the first score for the first sub-keyword is larger than a first threshold score and detects the second sub-keyword when the second score for the second sub-keyword is larger than a second threshold score.

The sub-keyword acceptance determination module 34 determines to accept the first sub-keyword, for example, when the first sub-keyword is detected from one or more first frames of the frames included in the voice data. Then, when the second sub-keyword is detected from one or more second frames of the frames, the sub-keyword acceptance determination module 34 determines whether to accept the second sub-keyword, based on a start time and/or an end time of the one or more first frames and a start time and/or an end time of the one or more second frames. The sub-keyword acceptance determination module 34 determines to accept the second sub-keyword when a first difference between the end time of the one or more first frames and the start time of the one or more second frames is within a range defined by a first time difference threshold and a second time difference threshold. The sub-keyword acceptance determination module 34 determines to accept the second sub-keyword when, for example, the first difference is equal to or greater than the first time difference threshold and less than the second time difference threshold (where the first time difference threshold<the second time difference threshold).

When the sub-keyword acceptance determination module 34 determines to accept the second sub-keyword, the composite keyword detection module 35 outputs the first keyword since the second sub-keyword is the final sub-keyword forming the first keyword.

In a case where the second keyword includes the first sub-keyword and a third sub-keyword following the first sub-keyword, the keyword score calculation module 32 may further calculate a third score for the third sub-keyword by matching a phoneme sequence, a phonological representation, a pronunciation notation, a mora, or a notation associated with the third sub-keyword with each frame of the voice data.

The keyword detection module 33 further detects the third sub-keyword based on the third score. For example, the keyword detection module 33 detects the first sub-keyword when the first score for the first sub-keyword is larger than the first threshold score, does not detect the second sub-keyword when the second score for the second sub-keyword is equal to or less than the second threshold score, and detects the third sub-keyword when the third score for the third sub-keyword is larger than the third threshold score.

Next, the sub-keyword acceptance determination module 34 determines to accept the first sub-keyword when the first sub-keyword is detected from one or more third frames of the frames in the voice data. Then, when the third sub-keyword is detected from one or more fourth frames of the frames, the sub-keyword acceptance determination module 34 determines whether to accept the third sub-keyword based on a start time and/or an end time of the one or more third frames and a start time and/or an end time of the one or more fourth frames. The sub-keyword acceptance determination module 34, for example, determines to accept the third sub-keyword when a second difference between the end time of the one or more third frames and the start time of the one or more fourth frames is within a range defined by a third time difference threshold and a fourth time difference threshold. The sub-keyword acceptance determination module 34, for example, determines to accept the third sub-keyword when the second difference is equal to or greater than the third time difference threshold and less than the fourth time difference threshold (where the third time difference threshold<the fourth time difference threshold).

Then, the composite keyword detection module 35 outputs the second keyword when it is determined to accept the third sub-keyword.

In addition, the keyword score calculation module 32 may calculate a score for a third keyword by matching a phoneme sequence, a phonological representation, a pronunciation notation, a mora, or a notation associated with the third keyword with each frame of the voice data.

In this case, the keyword detection module 33 detects the third keyword based on a score for the third keyword and outputs the detected third keyword. When the score for the third keyword is larger than a threshold score, the keyword detection module 33 detects and outputs the third keyword.

Figure 4:
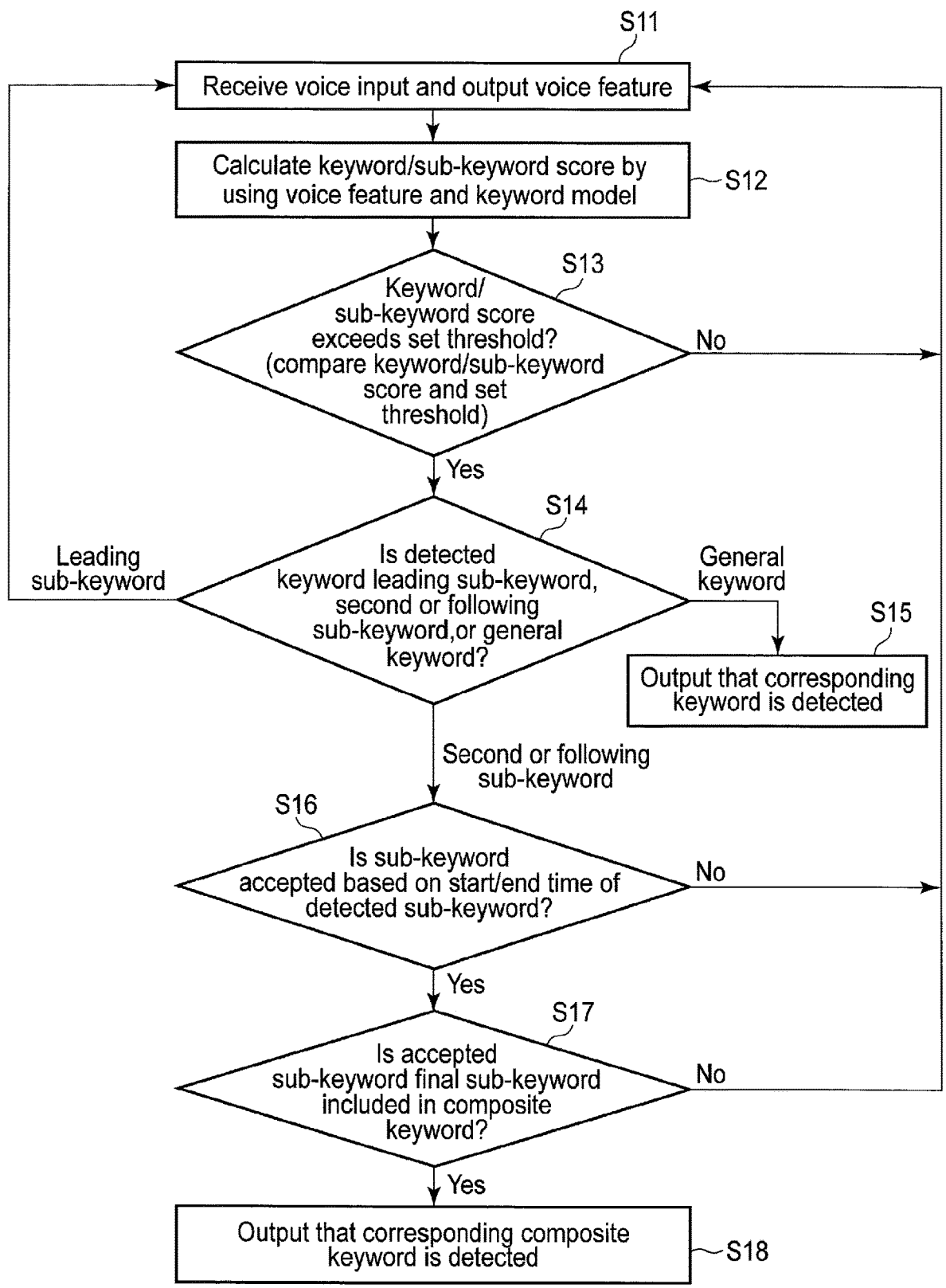
FIG. 4 is a flowchart showing an example of the procedure of voice keyword detection processing executed by the voice keyword detection apparatus of the first embodiment.

Next, an example of the procedure of voice keyword detection processing executed by the voice keyword detection apparatus 10 will be described with reference to a flowchart in FIG. 4. This voice keyword detection processing is realized by executing instructions included in the voice keyword detection program 202 by the CPU 101.

The voice acquisition module 31 receives and digitizes a voice waveform and generates a voice feature (step S11). The voice waveform is recorded by using the microphone 107 etc. The voice acquisition module 31 converts the voice waveform from analog to digital and generates a feature vector by using digital voice data obtained by the conversion. To convert the voice waveform from analog to digital, the voice waveform is converted from an analog wave to a digital wave by using a general AD conversion. In the conversion, for example, the voice acquisition module 31 samples an analog wave at 16 kHz and expresses an amplitude value of a sample of a digital wave is represented by 16 bits. The voice acquisition module 31 segments the digital wave at constant intervals.

Here, a case is exemplified where the voice acquisition module 31 segments a digital wave for each 256 point samples by shifting each 128 point samples. This 256 point samples correspond to one frame. As a result, the voice acquisition module 31 acquires voice data including frames.

The voice acquisition module 31 extracts twelve dimensional Mel Frequency Cepstral Coefficient (MFCC) feature from the 256 point samples. Then, the voice acquisition module 31 buffers the MFCC features for three frames and outputs thirty-six dimensional feature obtained by concatenating the MFCC features for the three frames as a feature at a time of a central frame in the three frames. The extracted feature is not limited to MFCC. For example, the Mel Filter bank feature and the Perceptual Linear Prediction (PLP), the RSTA-PLP feature, a pitch feature, or the A component or the ΔΔ component thereof may be used. Further, these features may be combined. Furthermore, the number of concatenating frames is not limited to three. One or more frames may be concatenated. In addition, a segment sample size and a frame period are not limited to the above-described values.

The keyword score calculation module 32 calculates a keyword/sub-keyword score (hereinafter also referred to as a score) for the voice feature by using a keyword model and a sub-keyword model (keyword/sub-keyword model) stored in the keyword model storage unit 36 (step S12). The keyword score calculation module 32 receives a voice feature generated by the voice acquisition module 31 and calculates a keyword/sub-keyword score by using a keyword/sub-keyword model.

Here, an example will be specifically described in which keywords to be detected are "communication", "communicator" and "hello". There are many methods for calculating an accumulative score for voice feature vectors segmented for each frame by using a keyword model, with respect to each of these keywords. Here, a method using the left-to-right type Hidden Markov Model (HMM) and a Viterbi algorithm will be exemplified.

Figure 5:
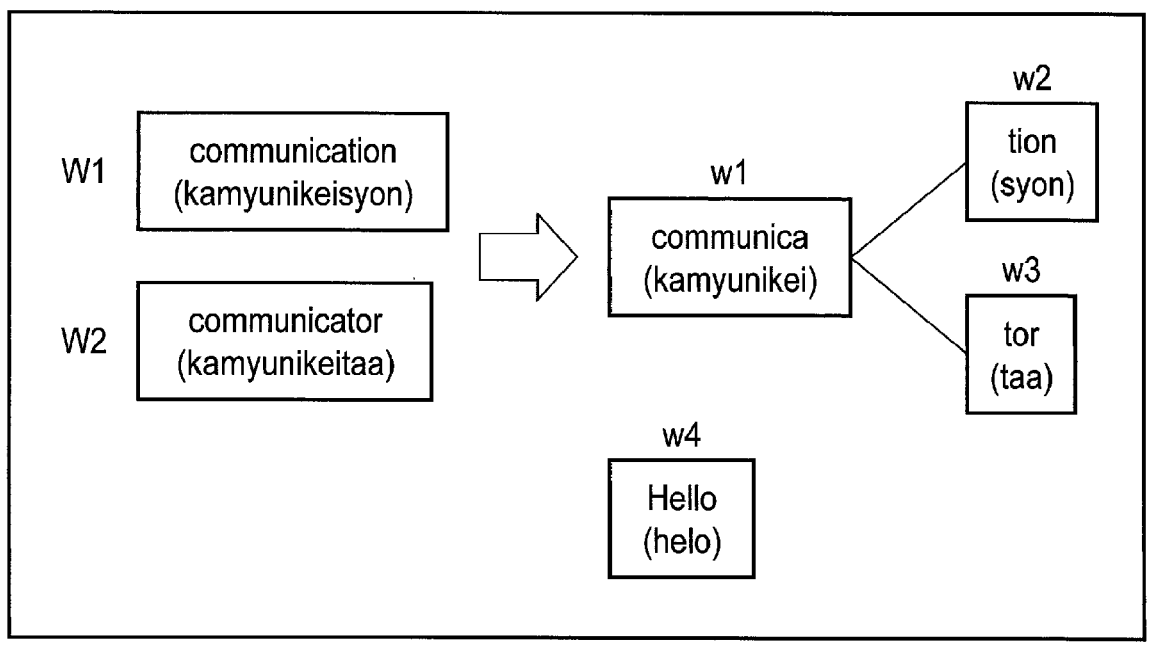
FIG. 5 is an illustration for describing a keyword/sub-keyword model used by the voice keyword detection apparatus of the first embodiment.

As illustrated in FIG. 5, keywords and sub-keywords, "communica", "tion", "tor", and "hello" are denoted by $w_1$, $w_2$, $w_3$, and $w_4$, and each of composite keywords, "communication" and "communicator", are respectively represented by $W_1 = (w_1, w_2)$ and $W_2 = (w_1, w_3)$ that indicate concatenations of the sub-keywords. First, as the keyword/sub-keyword model, models of $w_n$ (n=1, 2, 3, 4) are prepared. The keyword/sub-keyword model includes a model represented by a left-to-right type phoneme HMM. In the phoneme HMM, each phoneme is set to one state. More specifically, each of phonemes of phoneme sequences, "k a my u n i k e i", "sy o n", "t a a", and "h e l o u", which represent $w_1$, $w_2$, $w_3$, and $w_4$, respectively, is set to one state. In addition, as a parameter of the HMM, transition probabilities between the phonemes are same in any transition, and an output probability is represented by an appearance probability (acoustic score) of phonemes in each frame. In the embodiment, a model calculating the acoustic score for each frame is a feed-forward-type neural network common to keywords, and an accumulative score is calculated by using the Viterbi algorithm.

An output layer of the neural network to calculate an acoustic score is formed by thirteen output units determined by excluding overlapping phonemes from phonemes "k a my u n i k e i", "sy o n", "t a a", and "h e l o u", which represent $w_1$, $w_2$, $w_3$, and $w_4$, respectively, and adding a phoneme, "sil", representing a silent section. An input layer includes thirty six input units corresponding to the calculated voice feature. Here, three layers each including 256 units are stacked in a middle layer. The neural network learns a read-aloud voice of three words including "communication", "communicator" and "hello" including a silent section, by using a back propagation.

As described above, by preparing a phoneme HMM for keywords, specifying a maximum accumulative acoustic score $S_n$ and a path having the score from among paths in which a phoneme HMM for $w_n$ reaches an end in frames from a start time of capturing voice to an end time (or an end frame) $t_e$ can be simply calculated by using the Viterbi algorithm. The start frame of the path having the maximum accumulative acoustic score $S_n$ for the phoneme HMM for $w_n$ is denoted by $t_{ns}$. For this method, for example, a method described in Japanese Patent Application KOKAI Publication No. 2016-0275405 may be used.

The keyword score calculation module 32 performs the score calculation repeatedly while incrementing the end time (end frame) $t_e$ in a time direction. At this time, a calculation amount can be reduced by skipping a score calculation in some frames. The maximum accumulative acoustic score $S_n$ is, for example, a total of logarithmic likelihoods in time-series, and the total may be used as a normalized value in a specific range (for example, range from 1 to 100 or a range from 0 to 100). The keyword score calculation module 32, for example, uses the maximum accumulative acoustic score $S_n$ of a keyword or a sub-keyword as a keyword/sub-keyword score of the keyword or the sub-keyword.

A keyword/sub-keyword model is not limited to modeling by phoneme units, and the keyword/sub-keyword model can be modeled by phonological representation units, mora units, pronunciation notation units, or notation character units. Further, a calculation method for an accumulative score is not limited to a method using the HMM and the Viterbi algorithm. A calculation method by combining a neural network having a recurrent structure, for example, the long short-term memory (LSTM), and the Connectionist Temporal Classification and a calculation method by using the Attention Model can be used. Further, with respect to an acoustic score calculation for each frame, a calculation method is not limited to a method using a feed forward type neural network, and a recurrent neural network such as the LSTM can be used. Furthermore, an acoustic score for each frame can be calculated also in the Gaussian Mixture Model.

The keyword detection module 33 compares a keyword/sub-keyword score with a set threshold score and determines whether there is a keyword or a sub-keyword having a score exceeding the threshold score (step f). The keyword detection module 33 compares a threshold score $th_n$ with respect to an accumulative acoustic score previously prepared for $w_n$ with the maximum accumulative acoustic score $S_n$. In a case where "n" satisfying $th_n < S_n$ is found from (n=1, 2, 3, 4), a value of the n is assigned to m. When a start time of the keyword is denoted by $t_{ms}$, the keyword $w_m$ in the start/end section ($t_{ms}$, $t_e$) is detected. To the threshold score $th_n$, a value used for all keywords is set. The value is a value in which an F value, which is a harmonic mean of a match ratio and a reproduction ratio, becomes maximum when using a voice data set for development including keywords and sub-keywords. In this case, when a value of the threshold score $th_n$ is increased, a keyword and a sub-keyword are not easily detected, and when the threshold score $th_n$ is lowered, a keyword and a sub-keyword is easily detected. Further, for example, in a case where the maximum accumulative acoustic score $S_n$ is normalized in a specific range, the threshold score $th_n$ may be set to any of values in the specific range.

Figure 6:
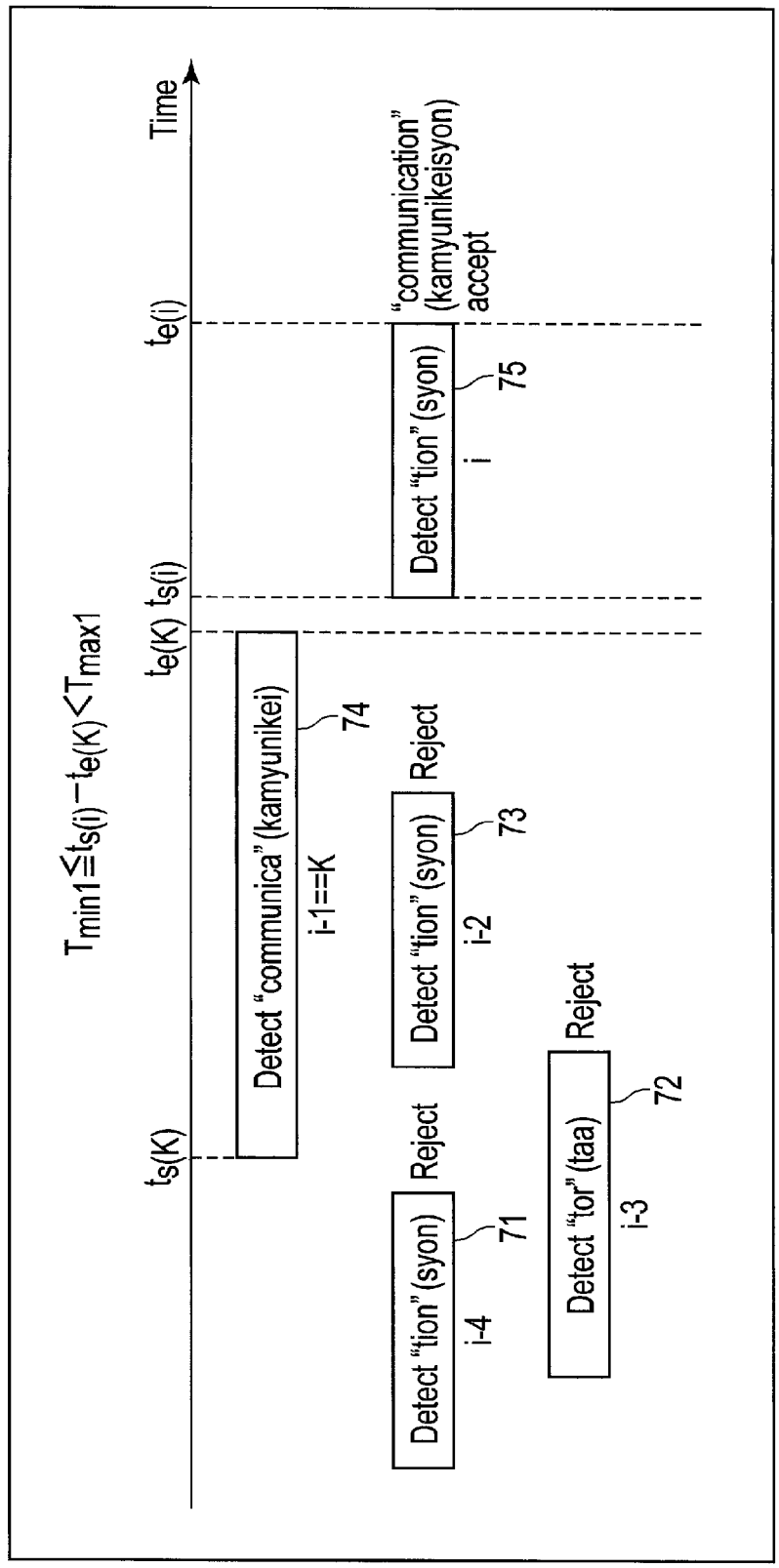
FIG. 6 is an illustration for describing an example of an operation in which the voice keyword detection apparatus of the first embodiment detects a keyword voice from a voice.

When the $w_m$ is detected, the keyword detection module 33 counts in which section the $w_m$ is detected by counting the detected section from a start time of capturing voice. As illustrated in FIG. 6, the keyword detection module 33 uses a section count i (i=1, 2, 3, . . . ) detected for the present processing frame $t_e$ and sets a start time $t_s(i)$ and an end time $t_e(i)$ ($t_s(i) < t_e(i)$) to frame counts (frame numbers) of a start and an end of the ith section in which a keyword or a sub-keyword is detected. Then, the keyword detection module 33 associates the start/end section ($t_s(i)$, $t_e(i)$) and the detected keyword or sub-keyword $w_m$ and store them in a predetermined storage region (for example, a work area in the main memory 103 or the nonvolatile memory 106). The detection method is not limited to a method described herein. For example, to reduce dispersion in accumulative scores due to section lengths, it may be detected whether an average of local scores exceeds a threshold score, by the method described in Japanese Patent Application KOKAI Publication No. 2016-0275405.

When a keyword or a sub-keyword exceeding the threshold is not detected (No in step S13), the process for detecting a keyword or a sub-keyword from following voice data is continued by returning to step S11.

On the other hand, when there is a keyword or a sub-keyword exceeding the threshold, in other words, when a keyword or sub-keyword is detected (Yes in step S13), the keyword detection module 33 determines whether the detected keyword is any of a leading sub-keyword included in a composite keyword, a second or following sub-keyword included in a composite keyword, or a general keyword (in other words, a keyword which is not divided into sub-keywords) (step S14).

When the detected keyword is a leading sub-keyword included in a composite keyword ("a leading sub-keyword" in step S14), step S11 is performed again. In an example in FIG. 6, the detected sub-keyword 74 ("communica") corresponds to this leading sub-keyword.

When the detected keyword is a general keyword which is not a sub-keyword ("general keyword" in step S14), the keyword detection module 33 outputs that the keyword is detected (step S15).

When the detected keyword is a second or following sub-keyword included in a composite keyword ("second or following sub-keyword" in step S14), step S16 is performed. In an example in FIG. 6, the detected sub-keywords 71, 73, and 75 ("tion") and a sub-keyword 72 ("tor") correspond to the second or following sub-keyword.

As described above, in the embodiment, when the detected keyword/sub-keyword is $w_1$ "communica", it is determined to be a leading keyword of a composite keyword. Further, when the detected keyword/sub-keyword is $w_2$, "tion", or $w_3$, "tor", it is determined to be a second or following sub-keyword of a composite keyword. Further, when the detected keyword/sub-keyword is $w_4$, "hello", it is determined to be a general keyword.

When a detected keyword is a second or following sub-keyword included in a composite keyword ("second or following sub-keyword" in step S14), the sub-keyword acceptance determination module 34 determines whether to accept the detected sub-keyword based on a start time and/or an end time of the sub-keyword (step S16). Here, a case is exemplified where a sub-keyword $w_2$ "tion" or $w_3$ "tor" included in a composite keyword is detected in step S14.

When $w_2$ "tion", or $w_3$ "tor" is detected after a sub-keyword $w_1$ "communica", which is included in the composite keyword and precedes $w_2$ "tion" or $w_3$ "tor", is detected from, for example, the kth section (0<k<i), the sub-keyword acceptance determination module 34 determines whether to accept $w_2$ "tion", or $w_3$ "tor".

As illustrated in FIG. 6, the sub-keyword acceptance determination module 34 assigns a maximum value of k satisfying that a word associated with ($t_s(k)$, $t_e(k)$) is $w_1$ "communica" to K (K=i−1 in the example in FIG. 6). Then, the sub-keyword acceptance determination module 34 performs a comparison using a start time of the Kth section ($t_s(K)$, $t_e(K)$) and an end time of the ith section ($t_s(i)$, $t_e(i)$). For a composite keyword $W_l$ (l=1, 2), an acceptance minimum value $T_{min\ l}$ and an acceptance maximum value (where $T_{min\ l} < T_{max\ l}$) which are time difference thresholds are previously set. The sub-keyword acceptance determination module 34 accepts an ith detected sub-keyword when the following formula is satisfied.

$$T_{min\ l} < t_s(i) - t_e(K) < T_{max\ l}$$

The acceptance minimum value $T_{min\ l}$ and the acceptance maximum value $T_{max\ l}$ may be a negative value. To each of the acceptance minimum value $T_{min\ l}$ and the acceptance maximum value $T_{max\ l}$ which are time difference thresholds, a value used for all keywords is set. The value is, for example, a value in which an F value, which is a harmonic mean of a match ratio and a reproduction ratio, becomes maximum when using a voice data set for development including keywords and sub-keywords, as with the threshold score $th_n$.

When the detected sub-keyword is not accepted (No in step S16), step S11 is performed again. In FIG. 6, a case is exemplified where the detected sub-keywords 71, 72, and 73 are not accepted (Reject).

When the detected sub-keyword is accepted (Yes in step S16), the composite keyword detection module 35 determines whether the accepted sub-keyword is a final sub-keyword included in a composite keyword (step S17). When the accepted sub-keyword is not the final sub-keyword included in the composite keyword (No in step S17), step S11 is performed again.

On the other hand, when the accepted sub-keyword is the final sub-keyword included in the composite keyword (Yes in step S17), the composite keyword detection module 35 outputs that the composite keyword is detected (step S18). As illustrated in FIG. 6, the composite keyword detection module 35, for example, outputs the keyword $W_1$ "communication", when the final sub-keyword $w_2$ "tion" is accepted in step S16 after the leading sub-keyword $w_1$ "communica" of the keyword $W_1$ "communication" is detected. Further, the composite keyword detection module 35, for example, outputs the keyword $W_2$ "communicator", when the final sub-keyword $w_3$ "tor" is accepted in step S16 after the leading sub-keyword $w_1$ "communica" of the keyword $W_2$ "communicator" is detected.

As described above, keywords including composite keywords can be detected.

Next, with reference to FIGS. 7 to 10, an example of data stored in the keyword model storage unit 36 will be described. This data may be read and updated by each module in the voice keyword detection program 202.

FIG. 7 is a configuration example of keyword/sub-keyword data. The keyword/sub-keyword data include records corresponding to keywords or sub-keywords. Each record includes, for example, an ID, a phoneme sequence, and a threshold score. Each record may include at least one of a phonological representation, a mora, a pronunciation notation, and a notation instead of or in addition to a phoneme sequence.

In a record corresponding to a keyword or a sub-keyword, "ID" indicates identification information given to the keyword or the sub-keyword. "Phoneme sequence" indicates one or more phonemes corresponding to the keyword or the sub-keyword. "Threshold score" indicates a threshold of a score to be detected as the keyword or the sub-keyword.

This keyword/sub-keyword data is used, for example, for calculation of a keyword/sub-keyword score by the keyword score calculation module 32 and for detection of a keyword and a sub-keyword by the keyword detection module 33.

FIG. 8 is a configuration example of composite keyword data. The composite keyword data include records corresponding to composite keywords. Each record includes, for example, ID and a sub-keyword sequence.

In a record corresponding to a composite keyword, "ID" indicates identification information given to the composite keyword. The "sub-keyword sequence" indicates a permutation of IDs given to sub-keywords included in the composite keyword. This "sub-keyword sequence", for example, indicates the permutation of IDs that are included in keyword/sub-keyword data in FIG. 7.

By using the composite keyword data and the keyword/sub-keyword data, the keyword detection module 33, for example, can determine whether a detected keyword/sub-keyword is any of a leading keyword of the composite keyword, a second or following sub-keyword of the composite keyword, and a general keyword.

FIG. 9 indicates a configuration example of time difference threshold data. The time difference threshold data includes records corresponding to pairs of sub-keywords. Each record includes, for example, a sub-keyword sequence, an acceptance minimum value, and an acceptance maximum value.

In a record corresponding to a pair of sub-keywords, the "sub-keyword sequence" indicates a permutation of two IDs given to two sub-keywords included in the pair of sub-keywords. This "sub-keyword sequence", for example, indicates the permutation of two IDs that are included in the sub-keyword data in FIG. 7.

"Acceptance minimum value" indicates a minimum detection interval between sub-keywords for accepting two sub-keywords detected from voice data as a pair of sub-keywords. "Acceptance maximum value" indicates a maximum detection interval between sub-keywords for accepting two sub-keywords detected from voice data as a pair of sub-keywords. The intervals indicated by the "acceptance minimum value" and the "acceptance maximum value" may be, for example, a value based on the number of frames and a value based on a time.

By using this time difference threshold data, the sub-keyword acceptance determination module 34 can determine whether to accept the detected pair of sub-keywords.

FIG. 10 indicates a configuration example of score data. The score data is temporary data generated by the keyword score calculation module 32 and the keyword detection module 33 to detect a sub-keyword from voice data. The score data includes records corresponding to sub-keywords. Each record includes, for example, ID, a score, a start time, and an end time.

In a record corresponding to a sub-keyword, "ID" indicates ID given to the sub-keyword. This "ID", for example, indicates one of the IDs included in the sub-keyword data in FIG. 7.

"Score" indicates likelihood related to the sub-keyword. "Start time" indicates a start time of a period on voice data in which the sub-keyword is detected. "End time" indicates an end time of a period on voice data in which the sub-keyword is detected. A time indicated by "start time" and "end time" may be a time or may be a frame count. A value indicated by the "score" indicates likelihood in which data from a start time to an end time in voice data corresponds to the sub-keyword.

As described above, according to the embodiment, a keyword can be quickly and correctly detected from a voice. The sub-keyword acceptance determination module 34 determines to accept the first sub-keyword when the first sub-keyword is detected from one or more first frames in frames of voice data. Then, when the second sub-keyword is detected from one or more second frames in the frames, the sub-keyword acceptance determination module 34 determines whether to accept the second sub-keyword based on a start time and/or an end time of the one or more first frames and a start time and/or an end time of the one or more second frames. The composite keyword detection module 35 outputs the first keyword if it is determined to accept the second sub-keyword. As a result, for example, if many same pronunciation strings are included between two or more keywords, one keyword in the two or more keywords can be detected quickly and correctly.

As described above with reference to FIG. 1, the server 2 may have a voice keyword detection function. In such a case, the client 1 transmits voice data based on a voice collected by using a microphone to the server 2 on a network 3 via a communication device etc.

The server 2 receives voice data from the client 1 via a communication device. The server 2 detects a keyword from the received voice data by executing the above-described voice keyword detection program 202. Then, the server 2 transmits the detected keyword to the client 1.

Therefore, the client 1 can acquire a keyword by transmitting voice data to the server 2 having the voice keyword detection function as in a case where the client 1 has the voice keyword detection function. Further, the client 1 may include the voice acquisition module 31, a voice feature output from the client 1 may be transmit to the server 2, and the server 2 may perform following processing using the voice feature.

Second Embodiment

FIG. 11 illustrates a functional configuration of a voice keyword detection program 202 executed by a voice keyword detection apparatus 10 according to a second embodiment. This voice keyword detection apparatus 10 has the system configuration described in the first embodiment. The voice keyword detection program 202 of the embodiment includes a voice acquisition module 31, a keyword score calculation module 32, a keyword detection module 33, a sub-keyword acceptance determination module 34, a composite keyword detection module 35, a threshold score display module 41, a threshold score adjustment module 42, a time difference threshold display module 43, and a time difference threshold adjustment module 44. Each module in the voice keyword detection program 202 may read various data stored in a keyword model storage unit 36 and may write data in the keyword model storage unit 36. The voice acquisition module 31, the keyword score calculation module 32, the keyword detection module 33, the sub-keyword acceptance determination module 34, the composite keyword detection module 35, and the keyword model storage unit 36 have the same configurations as in the first embodiment. The following description will be focused on a different portion from the first embodiment.

The threshold score display module 41 displays, on a screen of an LCD 104, a present threshold score for each of keywords and sub-keywords stored in the keyword model storage unit 36. Further, the threshold score display module 41 may display, on a screen of the LCD 104, a user interface to change a present threshold score of a keyword or a sub-keyword stored in the keyword model storage unit 36. This user interface includes, for example, a text area capable of rewriting a threshold score, a button to increase or reduce the threshold score, and a pull-down menu to select an arbitrary value from multiple values. The threshold score display module 41 accepts a change in a threshold score, in response to an operation by a user using the keyboard 109 and/or the pointing device 110.

The threshold score adjustment module 42 changes a threshold score in accordance with an operation using the displayed user interface. The threshold score adjustment module 42 reflects, for example, a threshold score received from the threshold score display module 41 to a threshold score of each keyword/sub-keyword used by the keyword detection module 33. The threshold score adjustment module 42 may rewrite a threshold score of a keyword or a sub-keyword stored in the keyword model storage unit 36 by a threshold score of the keyword or the sub-keyword received from the threshold score display module 41.

For example, the threshold score display module 41 displays, on a screen, a user interface to change a first threshold score to be used to detect a first sub-keyword and/or a second threshold score to be used to detect a second sub-keyword. The threshold score adjustment module 42 changes the first threshold score and/or the second threshold score in accordance with an operation using this user interface.

The time difference threshold display module 43 displays, on a screen of the LCD 104, the present time difference threshold between sub-keywords included in a composite keyword stored in the keyword model storage unit 36. Further, the time difference threshold display module 43 may display, on a screen of the LCD 104, a user interface to change a present time difference threshold between sub-keywords included in a composite keyword stored in the keyword model storage unit 36. This time difference threshold includes, for example, a minimum value and a maximum value of a time difference indicating a range in which a time difference between sub-keywords is accepted. Further, the user interface includes, for example, a text area capable of rewriting a time difference threshold, a button to increase or reduce the time difference threshold, and a pull-down menu to select an arbitrary value from a plurality of values. The time difference threshold display module 43 accepts a change in a time difference threshold (for example, maximum and maximum time difference) in accordance with an operation by a user using the keyboard 109 and the pointing device 110.

The time difference threshold adjustment module 44 changes a time difference threshold in accordance with an operation by using the displayed user interface. The time difference threshold adjustment module 44 reflects, for example, a time difference threshold received from the time difference threshold display module 43 to a time difference threshold between sub-keywords to be used by the sub-keyword acceptance determination module 34. The time difference threshold adjustment module 44 may rewrite a time difference threshold between sub-keywords stored in the keyword model storage unit 36 to a time difference threshold between the sub-keywords received from the time difference threshold display module 43.

For example, the time difference threshold display module 43 displays, on a screen, a user interface to change a first time difference threshold and/or a second time difference threshold that are used to determine whether to accept a second sub-keyword detected after a first sub-keyword. The time difference threshold adjustment module 44 changes, the first time difference threshold and/or the second time difference threshold in accordance with an operation using this user interface. As described above, the sub-keyword acceptance determination module 34 can determine to accept the second sub-keyword when a first difference between an end time of one or more first frames in which a first sub-keyword is detected and a start time of one or more second frames in which a second sub-keyword following the first sub-keyword is detected is within a range defined by a first time difference threshold and a second time difference threshold.

Figure 12:
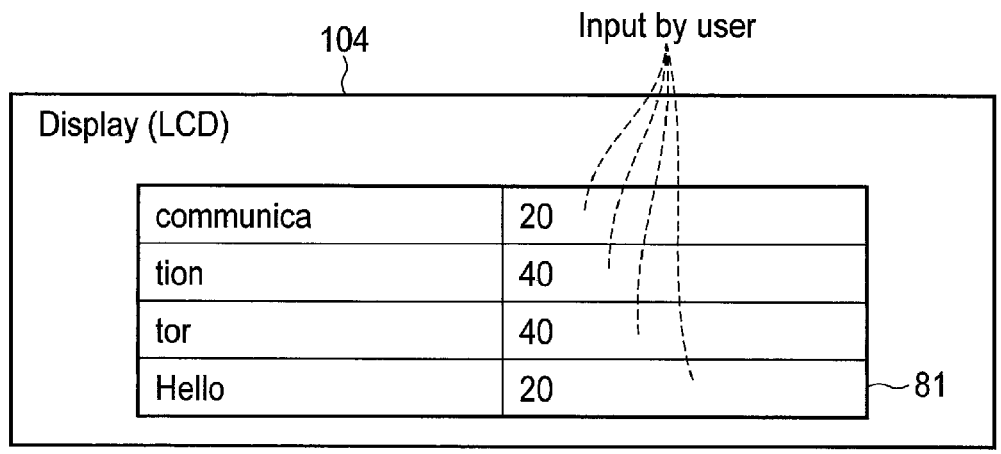
FIG. 12 is an illustration showing an example of a threshold adjustment screen displayed by the voice keyword detection apparatus of the second embodiment.

FIG. 12 shows an example of the threshold score adjustment screen 81 displayed on the display (LCD 104) by the threshold score display module 41. This threshold score adjustment screen 81 displays a threshold score of each of "communica", "tion", and "tor" which are sub-keywords and a threshold score of "Hello" which is a keyword. The displayed threshold score can be changed in accordance with an operation by a user (for example, input of a numerical value by a user). The threshold score adjustment module 42 can change a threshold score of a keyword or a sub-keyword in accordance with a user operation to change the threshold score of the keyword or the sub-keyword.

Figure 13:
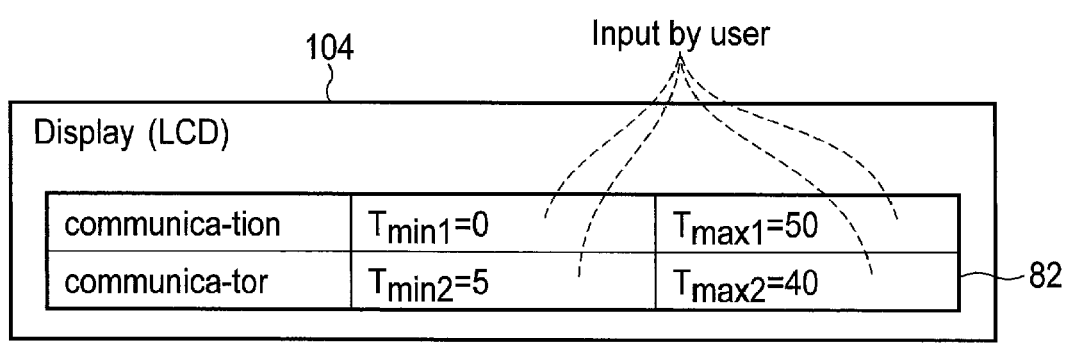
FIG. 13 is an illustration showing an example of a time difference threshold adjustment screen displayed by the voice keyword detection apparatus of the second embodiment.

Further, FIG. 13 shows an example of a time difference threshold adjustment screen 82 displayed on a display by the time difference threshold display module 43. This time difference threshold adjustment screen 82 displays an acceptance minimum value and an acceptance maximum value to determine whether to accept a pair of sub-keywords. More specifically, the screen 82 displays an acceptance minimum value and an acceptance maximum value to determine whether to accept a sub-keyword "tion" following a sub-keyword "communica" and an acceptance minimum value and an acceptance maximum value to determine whether to accept a sub-keyword "tor" following the sub-keyword "communica". Each of the displayed acceptance minimum values and acceptance maximum values can be changed in accordance with an operation by a user (for example, input of a numerical value by a user). The time difference threshold adjustment module 44 can change an acceptance minimum value or an acceptance maximum value for a pair of sub-keywords in accordance with a user operation to change the acceptance minimum value or the acceptance maximum value for the pair of sub-keywords.

Figure 14:
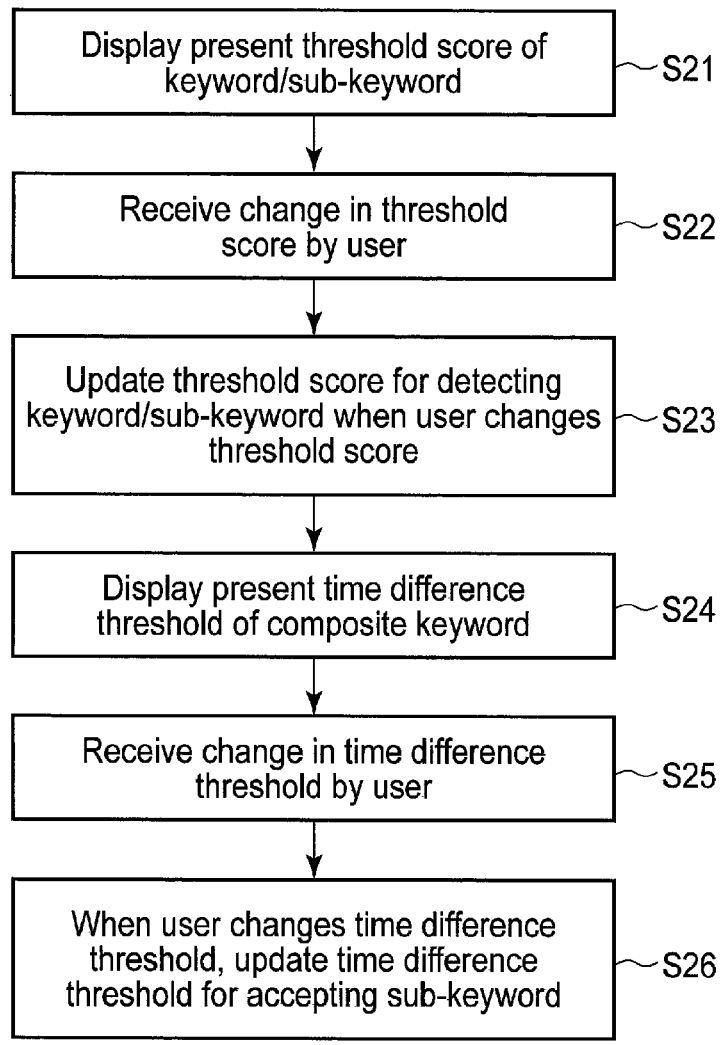
FIG. 14 is a flowchart showing an example of the procedure of threshold adjustment processing executed by the voice keyword detection apparatus of the second embodiment.

Next, an example of the procedure of threshold adjustment processing executed by the voice keyword detection apparatus 10 will be described with reference to a flowchart in FIG. 14. In the embodiment, as in the first embodiment, keywords to be detected are the following three keywords; "communication", "communicator", and "hello". Each of the keywords or the sub-keywords, "communica", "tion", "tor", and "hello" is denoted by $w_1$, $w_2$, $w_3$, and $w_4$. Each of composite keywords, "communication", "communicator" is represented by $$W_1 = (w_1, w_2) \text{ and } W_2 = (w_1, w_3)$$

that show concatenations of the sub-keywords. Further, as a keyword/sub-keyword model, a model of $w_n$ (where n=1, 2, 3, 4) is prepared by the same method as in the first embodiment.

First, the threshold score display module 41 displays, on a screen of the LCD 104, a present threshold score of each of keywords and sub-keywords (step S21). Here, a word (for example, notation) of a keyword or a sub-keyword and a threshold score, which is used in the keyword detection module 33 and is associated with the word, that are stored in the keyword model storage unit 36 are displayed as with the threshold score adjustment screen 81 illustrated in FIG. 12. Here, a present threshold score is displayed. While an initial value is used, a same value with respect to every keywords and sub-keywords, for example, $th_n = 20$ (n=1, 2, 3, 4) is set.

Next, the threshold score display module 41 receives a change in a threshold score in accordance with a user operation (step S22). A user changes a threshold score to adjust such that, for example, a keyword or a sub-keyword can be easily detected or not be easily detected. For example, it is assumed the case where the sub-keyword $w_2$, "tion", and the sub-keyword $w_3$, "tor", are excessively detected in comparison with other keywords/sub-keywords. In this case, a user changes a threshold for the sub-keywords $w_2$ and $w_3$ from 20 to 40 by an operation via a graphical user interface (GUI) in a table on the threshold score adjustment screen 81 in FIG. 12 displayed by the threshold score display module 41. The threshold score display module 41 receives the change in the threshold score by the user operation.

The threshold score adjustment module 42 reflects a threshold score changed (received) in step S22 to a threshold score for detecting a keyword or a sub-keyword (step S23). The threshold score adjustment module 42, for example, rewrites, to 40, each of the threshold scores $th_2$ and $th_3$ for the sub-keywords $w_2$ and $w_3$ changed from 20 to 40 in the table on the threshold score adjustment screen 81 by a user operation. As a result, a user can freely adjust such that a keyword and a sub-keyword can be easily detected or not be easily detected.

Next, the time difference threshold display module 43 displays a present time difference threshold score of each composite keyword on a screen of the LCD 104 (step S24). Here, a composite keyword stored in the keyword model storage unit 36 and a time difference threshold, which is used by the keyword acceptance determination module 34 and is associated with the composite keyword, are displayed as with the time difference threshold adjustment screen 82 illustrated in FIG. 13. An acceptance minimum value $T_{min\ l}$ and an acceptance maximum value $T_{max\ l}$ which are present time difference thresholds are displayed herein. While an initial value is used, a same value for every pair of sub-keywords (composite keyword), for example, $T_{min\ l} = 0$ (l=1, 2) and $T_{max\ l} = 50$ (l=1, 2) is set.

Next, the time difference threshold display module 43 receives a change in a time difference threshold in accordance with a user operation (step S25). For example, it is assumed the case where the composite keyword $W_2$, "communica-tor", is excessively detected in comparison with the composite keyword $W_1$ "communica-tion". In this case, a user changes a time difference threshold for the composite keyword $W_2$ to "$T_{min\ 2} = 5$" and "Td=40" by an operation via GUI in a table on the time difference threshold adjustment screen 82 displayed by the time difference threshold display module 43 illustrated in FIG. 13. The time difference threshold display module 43 receives the change in the time difference threshold by the user operation.

The time difference threshold adjustment module 44 reflects a time difference threshold changed (received) in step S25 to a time difference threshold for determining whether to accept a sub-keyword (step S26). The time difference threshold adjustment module 44, for example, substitutes (sets) a time difference threshold changed in a table on the time difference threshold adjustment screen 82 by a user operation, to $T_{min\ 2}$ and $T_{max\ 2}$ used by the sub-keyword acceptance determination module 34. Specifically, the time difference threshold is changed from $T_{min\ 2} = 0$ and $T_{max\ 2} = 50$, to $T_{min\ 2} = 5$ and $T_{max\ 2} = 40$. As a result, a user can freely adjust such that a composite keyword can be easily detected or not be easily detected.

The case where a time difference threshold is adjusted for each composite keyword has been exemplified above. However, the time difference threshold may be adjusted for each concatenating unit of two pairs or three pairs of sub-keywords in a composite keyword. For example, in a case where one composite keyword includes three or more sub-keywords and includes a plural pair of sub-keywords, a time difference threshold may be adjusted for each pair of sub-keywords (for each concatenating unit of sub-keywords).

Orders from steps S21 to S23 to update a threshold score and from steps S24 to S26 to update a time difference threshold can be arbitrary replaced. For example, after steps S24 to S26, steps S21 to S23 may be executed. Further, steps S21 to S23 and steps S24 to S26 may be executed in parallel.

As described above, according to the embodiment, a user can easily adjust a degree of ease (or difficulty) of detecting a keyword and a sub-keyword by the voice keyword detection apparatus 10. A user can easily change a threshold score and a time difference threshold displayed on a screen via a user interface. Therefore, a user can easily adjust, in accordance with the changed threshold score, a degree of ease (or difficulty) of detecting a keyword and a sub-keyword and easily adjust, in accordance with the changed time difference threshold, a degree of ease (or difficulty) of detecting a composite keyword (a pair of sub-keywords).

A threshold score may be input as predetermined format data instead of being input via a user interface. The threshold score adjustment module 42, for example, may update a threshold score to be used by the keyword detection module 33 by using data in which a keyword or a sub-keyword and a threshold score corresponding to the keyword or the sub-keyword are described.

Similarly, an acceptance minimum value and an acceptance maximum value indicating a time difference threshold may be input as predetermined format data instead of being input via a user interface. The time difference threshold adjustment module 44, for example, may update, by using data in which a pair of sub-keywords, and an acceptance minimum value and an acceptance maximum value corresponding to the pair of sub-keywords are described, the acceptance minimum value and the acceptance maximum value to be used by the sub-keyword acceptance determination module 34.

As described above with reference to FIG. 1, in a case where a server 2 includes a voice keyword detection function, the server 2 may provide for a client 1 a web based user interface to change a threshold score and a time difference threshold to be used on the server 2. The server 2 causes the client 1 to display the user interface for changing a threshold score and a time difference threshold on a screen as illustrated in FIGS. 12 and 13 via a web browser or a dedicated application and receives the changed value.

Third Embodiment

Figure 15:
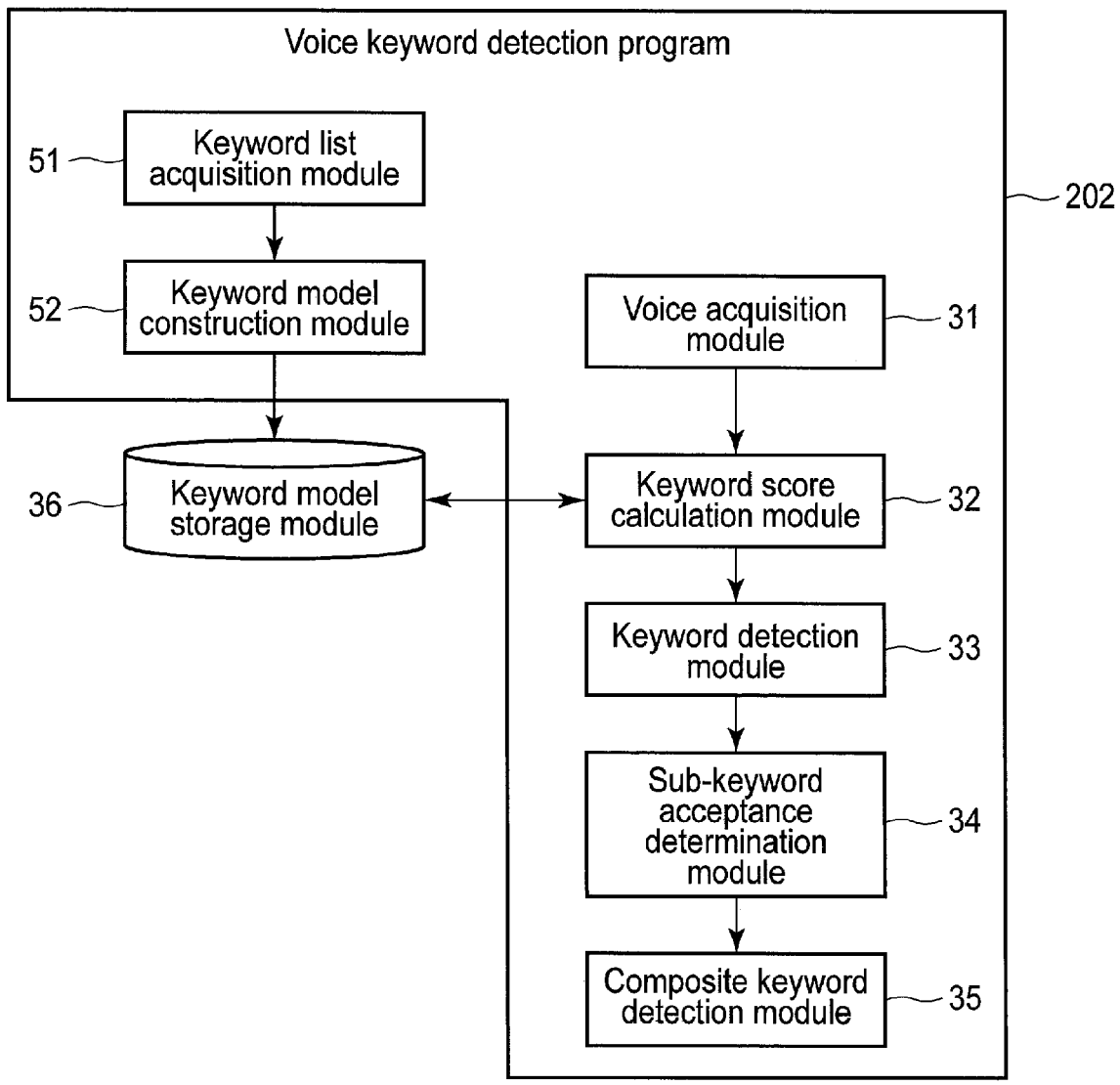
FIG. 15 is a block diagram illustrating a functional configuration of a voice keyword detection program executed by a voice keyword detection apparatus according to a third embodiment.

FIG. 15 illustrates a functional configuration of a voice keyword detection program 202 executed by a voice keyword detection apparatus 10 according to a third embodiment. This voice keyword detection apparatus 10 has the system configuration described in the first embodiment. The voice keyword detection program 202 of the embodiment includes a voice acquisition module 31, a keyword score calculation module 32, a keyword detection module 33, a sub-keyword acceptance determination module 34, a composite keyword detection module 35, a keyword list acquisition module 51, and a keyword model construction module 52. Each module of the voice keyword detection program 202 may read various data stored in a keyword model storage unit 36 and may write data in the keyword model storage unit 36. The voice acquisition module 31, the keyword score calculation module 32, the keyword detection module 33, the sub-keyword acceptance determination module 34, the composite keyword detection module 35, and the keyword model storage unit 36 have the same configurations as in the first embodiment. The following description will be focused on a different portion from the first embodiment.

The keyword list acquisition module 51 acquires a keyword list including keywords. For example, the keyword list acquisition module 51 may acquire a list of keywords text-input by using a keyboard 109 etc., by a user and may acquire, as a keyword list, data in which keywords are described in a predetermined format.

The keyword model construction module 52 extracts portions in which a phoneme sequence, a phonological representation, a mora, a pronunciation notation, or a notation representing each keyword is common and different in keywords, from the acquired keyword list. Then, the keyword model construction module 52 constructs keyword models and sub-keyword models (keyword/sub-keyword model) based on the extracted common portions and different portions. The keyword model construction module 52, for example, determines sub-keywords corresponding to portions in which a phoneme sequence, a phonological representation, a pronunciation notation, a mora or a notation indicating each keyword is same or different among the keywords and constructs sub-keyword models based on the determined sub-keywords. By using the determined sub-keywords (sub-keyword models), the keyword model construction module 52 determines (constructs) a composite keyword model which defines sub-keywords each included in two or more keywords of the keywords and an utterance order among the sub-keywords. The constructed keyword model (composite keyword model) and the sub-keyword models are stored in the keyword model storage unit 36.

By using a composite keyword model corresponding to the first keyword including the first sub-keyword and the second keyword following the first sub-keyword, the keyword score calculation module 32 calculates, for example, a first score for a first sub-keyword and a second score for a second sub-keyword. Then, the keyword acceptance determination module 34 determines to accept the first sub-keyword and the second sub-keyword by using the composite keyword model.

Figure 16:
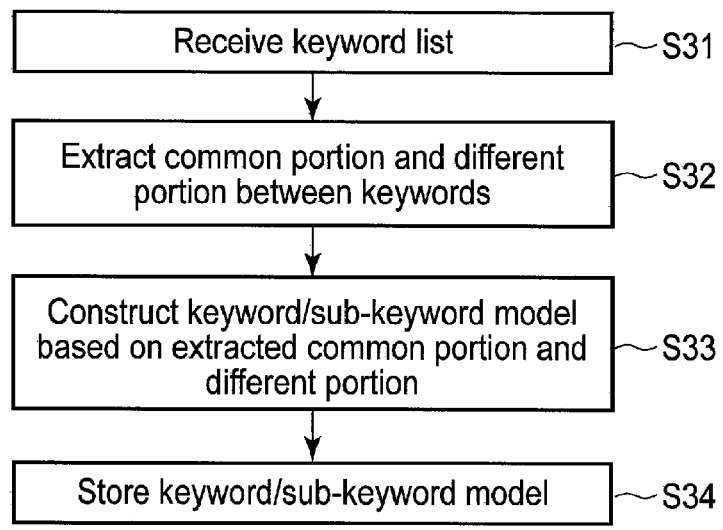
FIG. 16 is a flowchart showing an example of the procedure of keyword model construction processing executed by the voice keyword detection apparatus of the third embodiment.

An example of the procedure of keyword model construction processing executed by the voice keyword detection apparatus 10 will be explained with reference to a flowchart in FIG. 16. This voice keyword detection apparatus 10 is realized by executing instructions included in the voice keyword detection program 202 by a CPU 101.

First, the keyword list acquisition module 51 accepts a keyword list (step S31). The keyword list acquisition module 51, for example, acquires keywords, "communication", "communicator", and "hello", and phoneme sequences, "k a my u n i k e i sy o n", "k a my u n i k e i t a a", and "h e l o u" associated with the keywords, respectively.

Next, the keyword model construction module 52 extracts common portions and different portions among keywords from the acquired keyword list (step S32). Phoneme sequences and a radix tree are used to extract the common portions and the different portions. When phoneme sequences of keywords are represented by a radix tree structure, each branch of the radix tree structure corresponds to either a common portion or a different portion and becomes any of the keywords and sub-keywords.

The keyword model construction module 52, for example, creates a radix tree in the following manner.

First, the keyword model construction module 52 resisters phonemes of a first keyword included in a keyword list to a radix tree.

Next, when phonemes of a second keyword are registered, the keyword model construction module 52 scans the radix tree from a root to a portion in which the phonemes of the second keyword match. Then, in a case where a different portion which does not exist in the present radix tree is found in a part of the phonemes of the second keyword, the keyword model construction module 52 adds a new branch to the radix tree to resister the different portion. The keyword model construction module 52 registers the different portion, that is the remaining phonemes of the second keyword, as a label of the added branch. In a case where a branch in which a part from the top to the middle of the remaining phonemes is common is already registered in the radix tree, the keyword model construction module 52 designs such that a branch corresponding to the common portion to the remaining phonemes and the registered branch is newly registered to the radix tree, and by branching off from the new branch into two, branches corresponding to different portions are further registered to the radix tree. By registering every phoneme sequence to the radix tree, the radix tree for the acquired keyword list can be created.

Next, the keyword model construction module 52 constructs a keyword/sub-keyword model based on the common portions and the different portions of the keyword extracted in step S32 (step S33). The keyword model construction module 52, for example, constructs a phoneme HMM with respect to each keyword/sub-keyword as in the first embodiment. A front and rear relation of a composite keyword used when the phoneme HMM is constructed can be obtained by tracing the radix tree, which is created in step S32, from a root. As a result, common portions and different portions of keywords are automatically extracted from a keyword list, and a keyword/sub-keyword model with respect to the keywords can be constructed.

Then, the keyword model construction module 52 stores the constructed keyword/sub-keyword model in the keyword model storage unit 36 (step S34).

Figure 17:
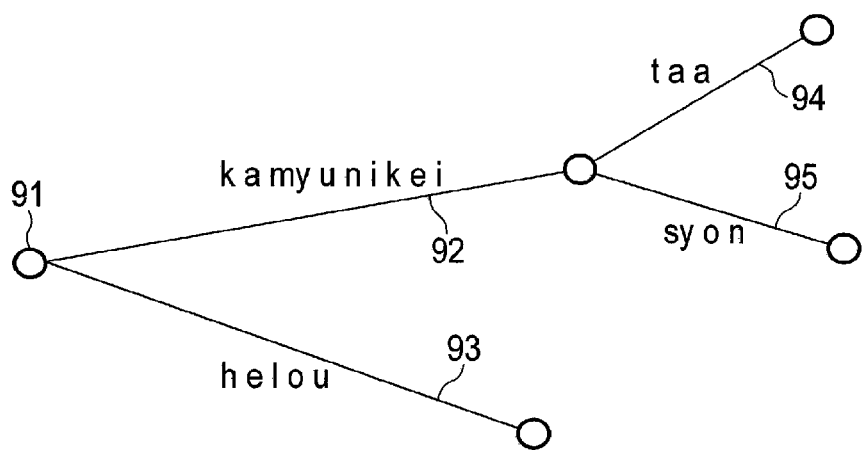
FIG. 17 is an illustration for describing an example of a radix tree created by a keyword detection apparatus of the third embodiment.

FIG. 17 indicates a specific example of a radix tree created by the keyword model construction module 52.

To create this radix tree, the keyword model construction module 52 first adds phonemes "k a my u n i k e i sy o n" corresponding to the first keyword "communication" to a radix tree as a branch connecting to a root 91.

Next, when registering phonemes "k a my u n i k e i t a a" corresponding to the second keyword "communicator", the keyword model construction module 52 scans the radix tree from the root 91 to a portion in which the phonemes of the second keyword match. In the creating radix tree, a branch completely matched with the phonemes "k a my u n i k e i t a a" is not included, and a branch "k a my u n i k e i sy o n" common from the top to the middle of the phonemes is already registered. Therefore, the keyword model construction module 52 newly adds, to the radix tree, a branch "k a my u n i k e i" 92 corresponding to the common portion between the phonemes "k a my u n i k e i t a a" and the already registered branch "k a my u n i k e i sy o n", instead of the already registered branch "k a my u n i k e i sy o n". Then, the keyword model construction module 52 designs such that the radix tree branches off from the new branch "k a my u n i k e i" 92 into two, and then a branch "t a a" 94 and a branch "sy o n" 95 corresponding to the different portions are further added.

Next, when registering phonemes "h e l o u" corresponding to the third keyword "hello", the keyword model construction module 52 scans a radix tree from the root 91 to a portion in which phonemes of the third keyword match. The creating radix tree does not include a branch completely matching with the phonemes "h e l o u" and a branch common from the top to the middle of the phonemes "h e l o u". Therefore, the keyword model construction module 52 adds the phonemes "h e l o u" to the radix tree as a branch 93 connecting to the root 91.

According to the above-described configuration, a radix tree with respect to the acquired keyword, "communication", "communicator" and "hello" can be created. As described above, the keyword model construction module 52 can obtain portions common and different among keywords by using this radix tree. Therefore, a keyword/sub-keyword model corresponding to the acquired keyword list can be easily constructed. In addition to a radix tree, a common portion in keywords may be extracted by using the Longest Common Subsequence algorithm and the Dynamic Programming matching.

The voice keyword detection apparatus 10 described in any of the embodiments according to the present invention may be realized by previously installing the above-described voice keyword detection program 202 in a general-purpose computer and may be realized by appropriately installing the program 202, which is stored in a storage medium such as a CD-ROM or is distributed via a network, in a computer. The keyword model storage unit 36 may be realized by appropriately using a memory or a hard disk incorporated in or externally attached to the above computer, or a storage medium such as CD-R, a CD-RW, a DVD-RAM, and a DVD-R.

Further, each of various functions described in any of embodiments of the present invention may be realized by a circuit (processing circuit). Examples of the processing circuit include a programmed processor such as a central processing unit (CPU). This processor performs each described function by executing a computer program (instructions) stored in a memory. This processor may be a microprocessor including an electric circuit. Examples of a processing circuit include a digital signal processor (DSP), an application specific integrated circuit (ASIC), a micro controller, a controller, and other electric circuit components. Each of components other than the CPU described in the embodiments may be realized by a processing circuit.

In addition, since the processing of each of the above-explained embodiments can be implemented by a computer program, the same advantage as that of the present embodiment can easily be obtained by installing the computer program in a computer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A voice keyword detection apparatus comprising:
a memory; and
a circuit coupled with the memory,
wherein the circuit is configured to:
acquire voice data comprising frames;
calculate a first score for a first sub-keyword and a second score for a second sub-keyword by matching a phoneme sequence, a phonological representation, a pronunciation notation, a mora, or a notation associated with each of the first sub-keyword and the second sub-keyword with each frame of the voice data, wherein a first keyword comprises the first sub-keyword and the second sub-keyword which follows the first sub-keyword;
detect the first sub-keyword from the voice data based on the first score and detect the second sub-keyword from the voice data based on the second score;
determine, when the first sub-keyword is detected from one or more first frames of the frames, to accept the first sub-keyword and determine, when the second sub-keyword is detected from one or more second frames of the frames, whether to accept the second sub-keyword based on both at least one of a start time or an end time of the one or more first frames and at least one of a start time or an end time of the one or more second frames; and
output the first keyword when it is determined to accept the second sub-keyword.

2. The voice keyword detection apparatus of claim 1, wherein
the circuit is further configured to:
calculate, when a second keyword comprises the first sub-keyword and a third sub-keyword which follows the first sub-keyword, a third score for the third sub-keyword by matching a phoneme sequence, a phonological representation, a pronunciation notation, a mora, or a notation associated with the third sub-keyword with each frame of the voice data;
detect the third sub-keyword based on the third score;
determine, when the first sub-keyword is detected from one or more third frames of the frames, to accept the first sub-keyword and determine, when the third sub-keyword is detected from one or more fourth frames of the frames, whether to accept the third sub-keyword based on both at least one of a start time or an end time of the one or more third frames and at least one of a start time or an end time of the one or more fourth frames; and output the second keyword when it is determined to accept the third sub-keyword.

3. The voice keyword detection apparatus of claim 1, wherein
the circuit is further configured to:
calculate a score for a third keyword by matching a phoneme sequence, a phonological representation, a pronunciation notation, a mora, or a notation associated with the third keyword with each frame of the voice data;
detect the third keyword based on the score for the third keyword; and
output the detected third keyword.

4. The voice keyword detection apparatus of claim 1, wherein
the circuit is configured to:
detect the first sub-keyword when the first score for the first sub-keyword is larger than a first threshold score; and
detect the second sub-keyword when the second score for the second sub-keyword is larger than a second threshold score.

5. The voice keyword detection apparatus of claim 4, wherein
the circuit is further configured to change at least one of the first threshold score or the second threshold score.

6. The voice keyword detection apparatus of claim 5, wherein
the circuit is further configured to:
display, on a screen, a user interface for changing the first threshold score and/or the second threshold score; and
change at least one of the first threshold score or the second threshold score in accordance with an operation using the displayed user interface.

7. The voice keyword detection apparatus of claim 1, wherein
the circuit is further configured to:
determine to accept the second sub-keyword when a first difference between the end time of the one or more first frames and the start time of the one or more second frames is within a range specified by a first time difference threshold and a second time difference threshold.

8. The voice keyword detection apparatus of claim 7, wherein
the circuit is further configured to change at least one of the first time difference threshold or the second time difference threshold.

9. The voice keyword detection apparatus of claim 8, wherein
the circuit is configured to:
display, on a screen, a user interface for changing at least one of the first time difference threshold or the second time difference threshold; and
change at least one of the first time difference threshold or the second time difference threshold in accordance with an operation using the displayed user interface.

10. The voice keyword detection apparatus of claim 1, wherein the circuit is further configured to:
acquire keywords;
determine sub-keywords corresponding to portions in which a phoneme sequence, a phonological representation, a pronunciation notation, a mora, or a notation representing each of the keywords is common or different among the keywords;
determine a composite keyword model defining a plurality of sub-keywords of the determined sub-keywords and an utterance order of the plurality of sub-keywords, wherein two or more keywords of the keywords each comprises the plurality of sub-keywords;
calculate the first score and the second score by using the composite keyword model; and
determine to accept the first sub-keyword and the second sub-keyword by using the composite keyword model.

11. A voice keyword detection method comprising:
acquiring voice data comprising frames;
calculating a first score for a first sub-keyword and a second score for a second sub-keyword by matching a phoneme sequence, a phonological representation, a pronunciation notation, a mora, or a notation associated with each of the first sub-keyword and the second sub-keyword with each frame of the voice data, wherein a first keyword comprises the first sub-keyword and the second sub-keyword which follows the first sub-keyword;
detecting the first sub-keyword from the voice data based on the first score and detecting the second sub-keyword from the voice data based on the second score;
determining, when the first sub-keyword is detected from one or more first frames of the frames, to accept the first sub-keyword and determining, when the second sub-keyword is detected from one or more second frames of the frames, whether to accept the second sub-keyword based on both of at least one of a start time or an end time of the one or more first frames and at least one of a start time or an end time of the one or more second frames; and
outputting the first keyword when it is determined to accept the second sub-keyword.

12. The voice keyword detection method of claim 11, further comprising:
calculating, when a second keyword comprises the first sub-keyword and a third sub-keyword which follows the first sub-keyword, a third score for the third sub-keyword by matching a phoneme sequence, a phonological representation, a pronunciation notation, a mora, or a notation associated with the third sub-keyword with each frame of the voice data;
detecting the third sub-keyword based on the third score;
determining, when the first sub-keyword is detected from one or more third frames of the frames, to accept the first sub-keyword and determine, when the third sub-keyword is detected from one or more fourth frames of the frames, whether to accept the third sub-keyword based on both at least one of a start time or an end time of the one or more third frames and at least one of a start time or an end time of the one or more fourth frames; and
outputting the second keyword when it is determined to accept the third sub-keyword.

13. The voice keyword detection method of claim 11, further comprising:

calculating a score for a third keyword by matching a phoneme sequence, a phonological representation, a pronunciation notation, a mora, or a notation associated with the third keyword with each frame of the voice data;

detecting the third keyword based on the score for the third keyword; and outputting the detected third keyword.

14. The voice keyword detection method of claim 11, further comprising:

detecting the first sub-keyword when the first score for the first sub-keyword is larger than a first threshold score; and detecting the second sub-keyword when the second score for the second sub-keyword is larger than a second threshold score.

15. The voice keyword detection method of claim 14, further comprising:

changing at least one of the first threshold score or the second threshold score.

16. The voice keyword detection method of claim 15, further comprising:

displaying, on a screen, a user interface for changing at least one of the first threshold score or the second threshold score; and changing at least one of the first threshold score or the second threshold score in accordance with an operation using the displayed user interface.

17. The voice keyword detection method of claim 11, further comprising determining to accept the second sub-keyword when a first difference between the end time of the one or more first frames and the start time of the one or more second frames is within a range specified by a first time difference threshold and a second time difference threshold.

18. The voice keyword detection method of claim 17, further comprising changing at least one of the first time difference threshold or the second time difference threshold.

19. The voice keyword detection method of claim 18, further comprising:

displaying, on a screen, a user interface for changing at least one of the first time difference threshold or the second time difference threshold; and changing at least one of the first time difference threshold or the second time difference threshold in accordance with an operation using the displayed user interface.

20. The voice keyword detection method of claim 11, further comprising:

acquiring keywords;

determining sub-keywords corresponding to portions in which a phoneme sequence, a phonological representation, a pronunciation notation, a mora, or a notation representing each of the keywords is common or different among the keywords;

determining a composite keyword model defining a plurality of sub-keywords of the determined sub-keywords and an utterance order of the plurality of sub-keywords, wherein two or more keywords of the keywords each comprises the plurality of sub-keywords;

calculating the first score and the second score by using the composite keyword model; and determining to accept the first sub-keyword and the second sub-keyword by using the composite keyword model.

* * * * *